No. 845,168. PATENTED FEB. 26, 1907.
O. W. FISHER.
GRAIN DRILL.
APPLICATION FILED MAR. 27, 1906.
3 SHEETS—SHEET 1.
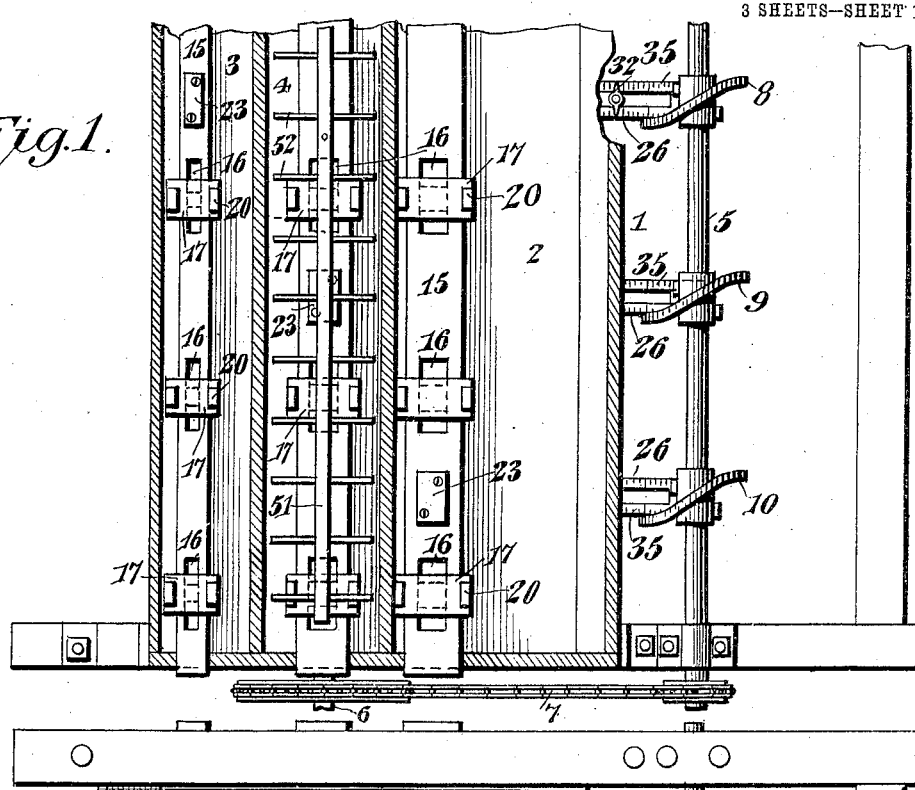
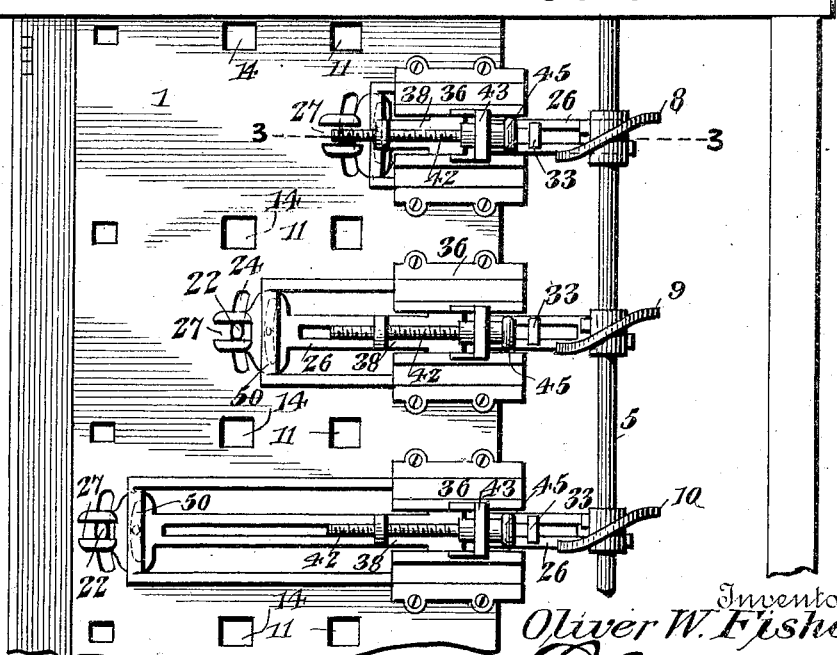
Witnesses
Jas. F. McCathran
J. H. Riley
Inventor
Oliver W. Fisher,
By E. G. Siggers
Attorney No. 845,168.
PATENTED FEB. 26, 1907.
O. W. FISHER.
GRAIN DRILL.
APPLICATION FILED MAR. 27, 1906.
3 SHEETS—SHEET 2.
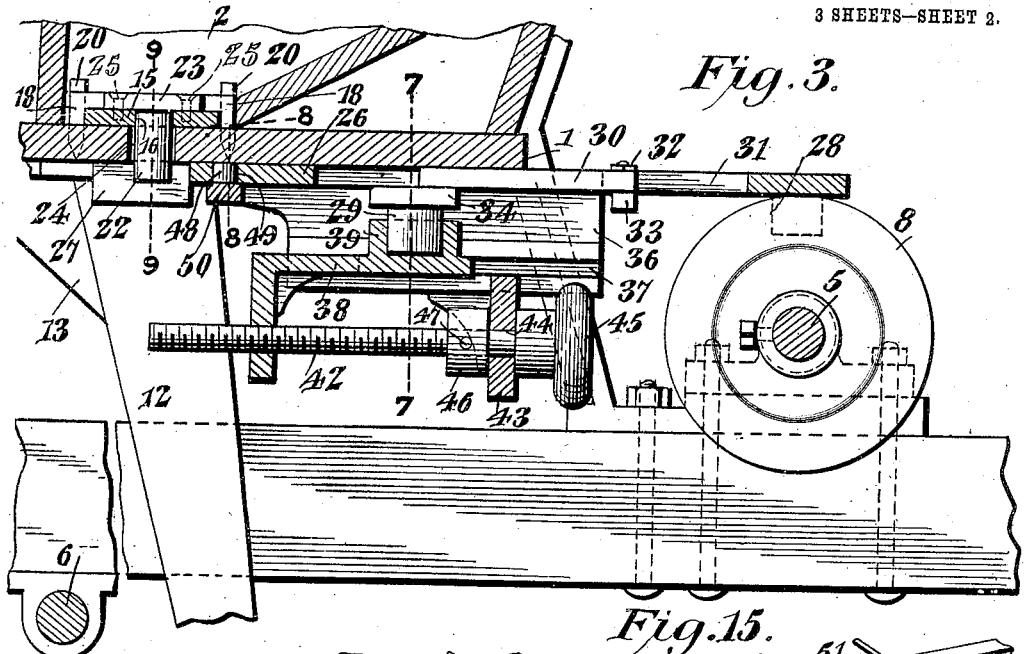
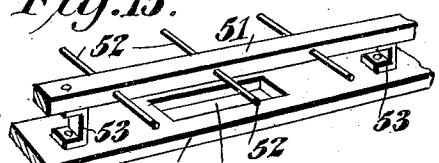
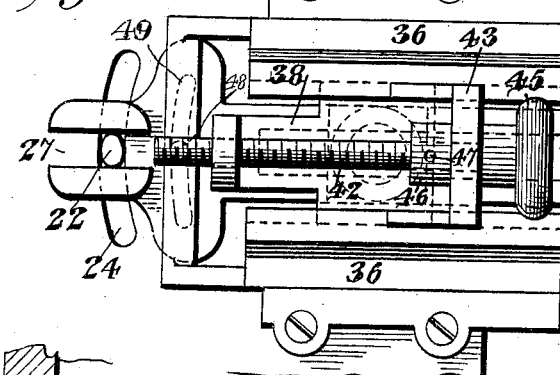
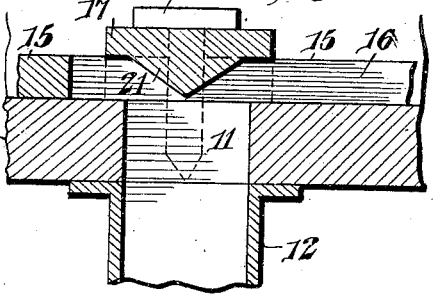
Oliver W. Fisher, Inventor
Witnesses
By
Attorney No. 845,168. PATENTED FEB. 26, 1907.
O. W. FISHER.
GRAIN DRILL.
APPLICATION FILED MAR. 27, 1906.
3 SHEETS—SHEET 3.
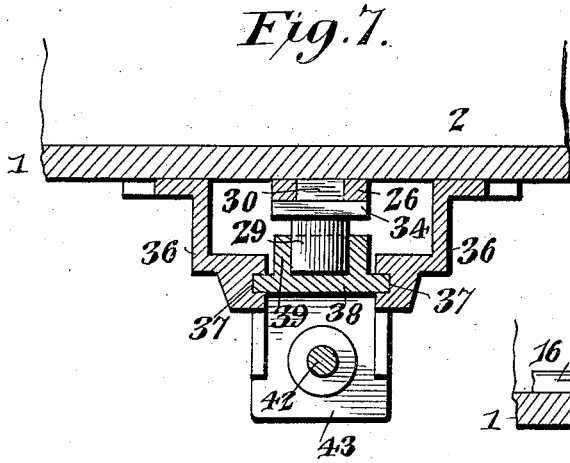
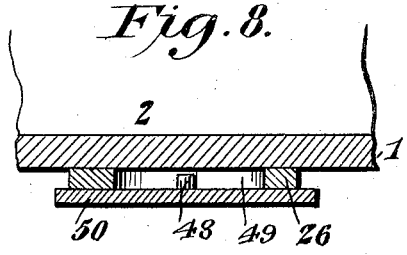
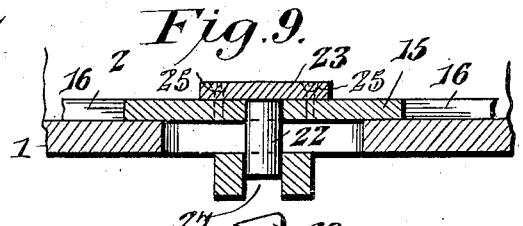
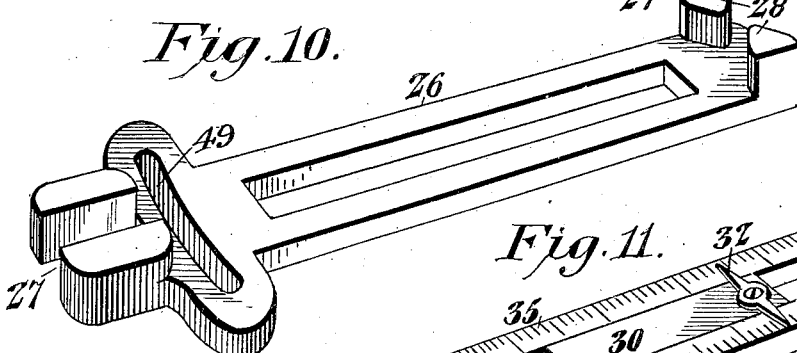
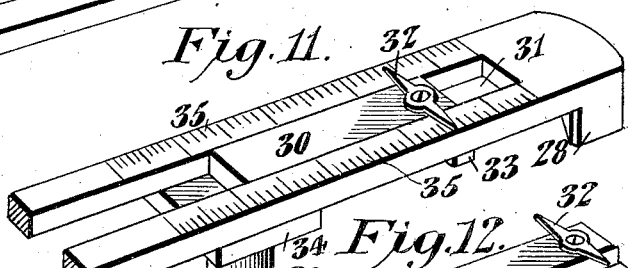
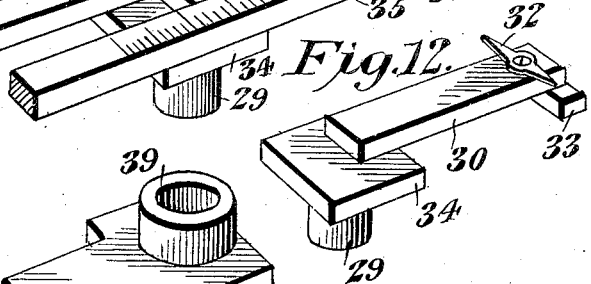
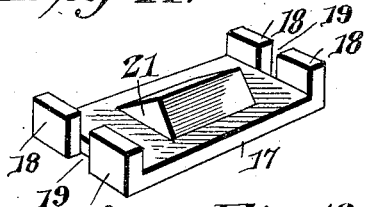
Oliver W. Fisher, Inventor
Witnesses
Jas. K. McCathran
By C. G. Siggers
Attorney
THE NORRIS PETERS CO., WASHINGTON, D. C.

UNITED STATES PATENT OFFICE.

OLIVER WATSON FISHER, OF JERSEY SHORE, PENNSYLVANIA.

GRAIN-DRILL.

No. 845,168.  Specification of Letters Patent.  Patented Feb. 26, 1907.

Application filed March 27, 1906. Serial No. 308,228.

*To all whom it may concern:*

Be it known that I, OLIVER WATSON FISHER, a citizen of the United States, residing at Jersey Shore, in the county of Lycoming and State of Pennsylvania, have invented a new and useful Grain-Drill, of which the following is a specification.

The invention relates to improvements in grain-drills.

The object of the invention is to improve the construction of that class of grain-drills which are provided with mechanism for dropping seed and fertilizer in the furrow and for simultaneously sowing grass and clover seed broadcast and to provide simple, inexpensive, and efficient dropping mechanism capable of fine adjustment, whereby the desired quantity of seed and fertilizer may be accurately and uniformly dropped while the machine is traveling over a predetermined area.

The invention also has for its object to provide a machine of this character in which the dropping mechanism may be rapidly adjusted for arranging the same to sow various kinds of grain.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a horizontal sectional plan view of a portion of the grain-drill constructed in accordance with this invention. Fig. 2 is an inverted plan view of the same, illustrating the arrangement of the dropping mechanism. Fig. 3 is an enlarged longitudinal sectional view on the line 3 3 of Fig. 2, illustrating the construction of the dropping mechanism. Fig. 4 is an inverted plan view of the same. Figs. 5 and 6 are detail sectional views illustrating the manner of mounting the slidable dropping-bar and the plate for causing the seed or fertilizer to be discharged into the drill-tubes. Fig. 7 is a transverse sectional view taken substantially on the line 7 7 of Fig. 3. Fig. 8 is a similar view taken substantially on the line 8 8 of Fig. 3. Fig. 9 is a detail sectional view on the line 9 9 of Fig. 3. Fig. 10 is a detail perspective view of the oscillatory lever, showing the lower face of the same. Fig. 11 is a detail perspective view of the outer portion of the lever, illustrating the arrangement of the pivot and showing the graduations for indicating the adjustments of the same. Fig. 12 is a detail perspective view of the adjustable member which carries the pivot. Fig. 13 is a detail perspective view of the adjustable slide for moving the pivot backward and forward. Fig. 14 is a detail perspective view of one of the plates, and Fig. 15 is a detail perspective view illustrating the construction of the agitator and the mechanism for dropping the fertilizer.

Like numerals of reference designate corresponding parts in all the figures of the drawings.

1 designates a seedbox or hopper, which is divided by suitable partitions into front and rear seed-compartments 2 and 3 and an intermediate fertilizer-compartment 4; but the compartments may be arranged in any other desired manner, as will be readily understood. The front compartment 2 is designed for holding the grain and the intermediate compartment preferably contains the fertilizer, which is dropped into the furrow simultaneously with the grain. The rear seed-hopper is designed for grass and clover seed of any variety, which is sown broadcast in the usual manner.

In Fig. 2 of the drawings the separate fertilizer and seed dropping mechanism are illustrated, and as the dropping mechanism of each compartment is constructed in the same manner, with the sole exception of the length of the parts, a detail description of one dropping mechanism is deemed sufficient. The dropping mechanism of each compartment is actuated by means of a transverse shaft 5, which is connected with the axle 6 of the machine by sprocket-gearing 7 and which is provided with cams 8, 9, and 10. The cam 8 actuates the seed-dropping mechanism of the front grain-receiving compartment, and the cam 9 actuates the dropping mechanism of the fertilizer-compartment, the dropping mechanism being of sufficient length to extend from the shaft 5 to the fertilizer-compartment and being slightly longer than the dropping mechanism of the front compartment. The cam 10 actuates the dropping mechanism of the rear compartment, which dropping mechanism is of a length to extend to the said rear compartment and which is of a greater length than the dropping mechanisms of the front and intermediate compartments.

The seedbox or hopper 1 may be of any desired size, and the front compartment is provided at intervals with discharge-openings 11, beneath which are secured conducting or drill tubes 12, which may be of any preferred constuction and which are connected by branch tubes 13 with the discharge-openings 14 of the intermediate fertilizer-receiving compartment, whereby the grain and fertilizer will be discharged into the drill-tubes 12. The seed of the front compartment is dropped into the drill-tube 12 by means of a slidable bar 15, arranged upon the bottom of the compartment 2 and provided at intervals with slots 16, located at the discharge-openings and extending beyond opposite sides of the same, whereby the seed will be delivered to the drill-tubes 12 by the sliding movement of the bar 15.

The bar 15 is guided in its reciprocation by means of plates or members 17, arranged at the slots 16 and extending across the bar 15, as clearly shown in Fig. 1 of the drawings. These plates or members 17 are provided at their ends with supporting-lugs 18, arranged in pairs and adapted to rest upon the bottom of the seedbox or hopper. The lugs 18 are spaced apart to provide recesses 19, through which pass the shanks or T-shaped fastening devices 20. The fastening devices 20, which are embedded in the bottom of the seedbox or hopper, engage the upper faces of the plates or members 17 and retain the same in position. The bar 15 slides between the pairs of lugs 18, and the said guide plates or members are also provided with depending approximately triangular enlargements or bosses 21, extending downwardly into the slots 16 and presenting oppositely-inclined faces for engaging the seed or fertilizer, whereby the same is positively discharged into the drill-tubes. The intermediate enlargements or bosses 21 have vertical end faces, which are spaced from the lugs 18 and which are arranged to engage the side walls of the slots 16 to assist in guiding the bar 15. By this arrangement the reciprocatable slide or bar 15 is guided in its movements, and the guide plates or members by being located directly above the discharge-openings of the seedbox or hopper prevent the seed or fertilizer from passing directly through the discharge-openings.

The bar 15 is provided with a depending pivot 22, preferably formed integral with a plate 23 and extending through an aperture 24 of the bar 15. The attachment plate or portion 23 of the pivot 22 is secured to the bar 15 by means of screws 25 or other suitable fastening devices, arranged as shown in Figs. 3 and 9 of the drawings. The pivot is engaged by the rear end of an oscillatory lever 26, which extends longitudinally of the machine. The rear end of the lever is provided with a slot or bifurcation 27, and it is enlarged at opposite sides to form projecting lugs. The pivot 22 is arranged in the slot or bifurcation, whereby the bar 15 will be reciprocated when the lever is oscillated.

The front end of the lever is provided with a pair of depending substantially triangular lugs 28, which are spaced apart to receive the cam 8, and they present inner rounded faces to the same for enabling the lever to be operated with a minimum amount of friction. The friction may be further reduced by antifriction devices. When the cam rotates, the lever will be oscillated and will actuate the slidable bar 15.

The lever 26 is fulcrumed at an intermediate point by an adjustable pivot 29, which is adapted to be moved backwardly and forwardly for varying the relative length of the arms of the lever 26, whereby the throw or movement of the bar 15 is varied to increase or diminish the amount of seed or fertilizer discharged at each movement of the slide or bar. The adjustable pivot is formed integral with a slidable plate or member 30, which operates in a longitudinal slot 31 of the lever, and which carries an indicating-hand or pointer 32. The plate or member 30, which is oblong, is provided with front and rear projecting flanges or portions 33 and 34, which engage the lower face of the lever and hold the plate or member against upward movement in the slot 31. The indicating-hand or pointer 32 is secured by a screw or other suitable fastening device to the upper face of the plate or member 30 at the front end thereof, and it has oppositely-tapered end portions which extend beyond the slot and move over the side portions of the lever. The side portions of the lever are provided with suitable graduations 35 for enabling the position of the pivot and the relative length of the arms of the lever to be accurately indicated, so that the parts may be adjusted for sowing various kinds of seed.

The lever extends into a casing 36, secured to the lower face of the bottom of the hopper or seed box and provided at opposite sides below the lever with ways 37, consisting of screws and receiving an adjustable slide 38, which carries a socket or bearing 39 for the pivot 29. The ways consists of opposite horizontal grooves, and the pivot 29 extends into the socket or bearing 39, which is cylindrical and which extends upwardly from the upper face of the slide 38, which has laterally-projecting portions to engage the ways 37 and is provided at its rear end with a depending arm or portion 40, having a threaded opening 41. The threaded opening 41 is engaged by an adjusting-screw 42, located beneath and extending longitudinally of the slide and swiveled at its front end to the casing. The casing is provided with a depending transverse portion 43, located beneath the ways and having a smooth opening 44, through which the screw passes. The screw is provided at its front end with a head 45, which fits against the front face of the depending transverse portion 43, and the rear face of the latter is engaged by a collar 46, arranged on the screw and secured to the same by a pin 47 or other suitable fastening device. The screw is adapted to be rotated for adjusting the slide 38, which is moved backwardly and forwardly by the rotation of the screw and which carries the pivot 29 with it, whereby the relative length of the front and rear arms of the oscillatory lever is varied. By means of the screw a very fine adjustment of the pivot may be obtained, and the dropping mechanism may be accurately adjusted for depositing the desired amount of any kind of seed while the machine is traveling a predetermined distance.

The casing is provided at its back with an upwardly-projecting stud 48, which extends into a curved slot 49 of the lever. The slot is disposed transversely of the lever and permits the necessary oscillatory movement of the same. The lever is enlarged at the slot 49 to permit a maximum movement. The stud 48 is preferably formed integral with a horizontally-disposed transverse portion 50, which connects the sides of the casing at the back thereof and which also forms a support for the rear arm of the lever. The stud prevents the lever from slipping longitudinally when the slidable plate or member 30 is moved along the slot 31 of the said lever.

The slide or bar of the mechanism for dropping the fertilizer carries an agitator consisting of a superimposed bar 51 and a series of projecting fingers 52, preferably formed by pins which pierce the bar 51 and extend from opposite sides thereof. The bar 51 is supported above the slide by brackets 53, consisting of vertical plates or pieces provided at their upper and lower ends with horizontal flanges secured, respectively, to the agitator-bar and to the reciprocatable dropping bar or slide. The agitator is adapted to break up the fertilizer to insure a positive feed of the same.

Having thus fully described my invention, what I claim as new, and desire to secure by Letters Patent, is—

1. A machine of the class described provided with a reciprocated dropping bar or slide, a superimposed agitator movable with the slide and consisting of a longitudinal bar and projecting fingers, and brackets mounted on the slide and supporting the agitator.

2. In a machine of the class described, the combination with a reciprocatable dropping bar or slide provided with a slot, of a guide fitting over the dropping bar or slide and receiving and guiding the same, and provided with means extending into the slot for causing material to be discharged therefrom.

3. In a machine of the class described, the combination with a reciprocatable dropping bar or slide having a slot, of a guide receiving the dropping bar or slide and provided with a projecting portion extending into the slot and having an inclined face for expelling the material carried by the slide.

4. In a machine of the class described, the combination with a reciprocatable slide having a slot, of a guide member provided with means for guiding the slide and having a substantially triangular boss or enlargement extending into the slot and presenting oppositely-inclined faces for expelling the material carried by the slide.

5. In a machine of the class described, the combination with a slide having a slot, of a guide plate or member fitting over the slide and having an intermediate projecting portion extending into the slot, said guide plate or member being also provided with supporting-lugs located at opposite sides of the slide and spaced from the intermediate projecting portion.

6. In a machine of the class described, the combination with a reciprocatable slide, of a guide plate or member fitted over the slide and having an intermediate projecting portion extending into the slot, said plate or member being provided at opposite sides of the slide with lugs arranged in pairs and spaced apart, and fastening means arranged in the spaces between the lugs and engaging the guide plate or member.

7. In a machine of the class described, the combination of a reciprocatable slide having a slot, a superimposed agitator provided with supporting means spaced from the slot and mounted on the slide, and a guide plate or member fitted over the slide and arranged between the same and the agitator, and provided with means extending into the slot for expelling the material therefrom.

8. In a machine of the class described, the combination with a reciprocatable slide, a lever provided with a transversely-disposed slot and connected with the slide, an adjustable fulcrum movable longitudinally of the lever for varying the relative length of the arms thereof, means for engaging the slot of the lever to hold the latter against longitudinal movement when the fulcrum is adjusted, and means for operating the lever.

9. In a machine of the class described, the combination with a reciprocatable slide, a lever provided with a transversely-disposed slot and connected with the slide, an adjustable fulcrum movable longitudinally of the lever for varying the relative length of the arms thereof, a fixed stud for engaging the slot, and means for operating the lever.

10. In a machine of the class described, the combination of a slide having a pivot, a lever provided with a bifurcation receiving the pivot of the slide, said lever being also provided with a transversely-disposed slot, a fulcrum adjustable longitudinally of the lever for varying the relative length of the arms of the same, a stud engaging the slot of the lever for holding the same against longitudinal adjustment when the fulcrum is adjusted, and means for operating the lever.

11. In a machine of the class described, the combination of a slide, a lever connected with the slide, a slidable plate or member mounted on the lever and provided with a fulcrum for the lever, an adjusting-screw connected with the sliding plate or member for moving the same longitudinally to vary the relative length of the arms of the same, and means for operating the lever.

12. In a machine of the class described, the combination of a lever, a dropping-bar actuated by the lever, a plate or member slidable on the lever and provided with a pivot, a slide having a bearing for the pivot and movable longitudinally of the lever for varying the relative length of the arms, and means for adjusting the slide.

13. In a machine of the class described, the combination of a dropping-bar, a lever for operating the same, a plate or member slidable on the lever and provided with a pivot, a slide having a bearing for the pivot, and an adjusting-screw for operating the slide.

14. In a machine of the class described, the combination of a slide, a lever operating the same, an adjustable plate or member mounted on the slide for longitudinal movement, a slide also movable longitudinally of the lever, said plate or member and slide carrying means for fulcruming the lever, and means for adjusting the slide to change the fulcrum-point.

15. In a machine of the class described, the combination of a dropping-bar, a lever for operating the same, said lever being provided with a longitudinal opening, a member movable in the opening and provided with a pivot, a slide having a bearing to receive the pivot and provided with a threaded opening, and a swiveled screw engaging the threaded opening for operating the slide.

16. In a machine of the class described, the combination of a dropping-bar, a lever for operating the same, said lever being provided with graduations, a member adjustable on the lever and carrying an indicator coöperating with the graduations, a slide, said member and slide being provided with means for fulcruming the lever, and means for adjusting the slide.

17. In a machine of the class described, the combination with a dropping-bar, of a lever for operating the same, a casing receiving the lever and provided with opposite ways, a slide movable in the ways and having a bearing, a pivot adjustably mounted on the lever and arranged in the bearing of the slide, and an adjusting-screw for operating the slide.

In testimony that I claim the foregoing as my own I have hereto affixed my signature in the presence of two witnesses.

OLIVER WATSON FISHER.

Witnesses:
ABE E. ALLEN,
A. M. GROFF.